United States Patent
Tsou (10) Patent No.: US 10,282,609 B2
(45) Date of Patent: May 7, 2019

(54) IDENTITY VERIFICATION AND APPARATUS

(71) Applicant: UTECHZONE CO., LTD., New Taipei (TW)

(72) Inventor: Chia-Chun Tsou, New Taipei (TW)

(73) Assignee: UTECHZONE CO., LTD., New Taipei (TW)

( * ) Notice: Subject to any disclaimer, the term of this patent is extended or adjusted under 35 U.S.C. 154(b) by 49 days.

(21) Appl. No.: 15/406,791

(22) Filed: Jan. 16, 2017

(65) Prior Publication Data

US 2017/0206400 A1    Jul. 20, 2017

(30) Foreign Application Priority Data

Jan. 18, 2016 (TW) ............... 105101318 A
Jan. 18, 2016 (TW) ............... 105101319 A (51) Int. Cl.
*G06K 9/00* (2006.01)

(52) U.S. Cl.
CPC ....... *G06K 9/0061* (2013.01); *G06K 9/00899* (2013.01); *G06K 2009/00939* (2013.01)

(58) Field of Classification Search
CPC ............. G06K 9/0061; G06K 9/00899; G06K 2009/00939

USPC .......................................................... 382/117
See application file for complete search history.

(56) References Cited

U.S. PATENT DOCUMENTS

| 8,457,367 B1 * | 6/2013 | Sipe ................ | G06K 9/00221 382/118 |
|---|---|---|---|
| 2014/0376772 A1 * | 12/2014 | Lin .................... | G06K 9/00335 382/103 |
| 2015/0358790 A1 * | 12/2015 | Nasserbakht ..... | G06F 17/30088 455/414.1 |

\* cited by examiner

*Primary Examiner* — Ping Y Hsieh
(74) *Attorney, Agent, or Firm* — JCIPRNET (57) ABSTRACT

An identity verification method and an identity verification apparatus are provided. A face image sequence of a user is analyzed to determine whether a biological feature conforms to a preset feature. An input interface is displayed after the biological feature conforms to the preset feature. An eye tracking detection is executed for a face image sequence to detect a blinking movement of the user. And a mental verification is executed by using the blinking movement. The invention combines the biological feature with the eye tracking detection for identity verification. The invention not only tightens security but also diversifies operation.

9 Claims, 4 Drawing Sheets

IDENTITY VERIFICATION AND APPARATUS

CROSS-REFERENCE TO RELATED APPLICATION

This application claims the priority benefits of Taiwan application serial no. 105101318, filed on Jan. 18, 2016, and Taiwan application serial no. 105101319, filed on Jan. 18, 2016. The entirety of each of the above-mentioned patent applications is hereby incorporated by reference herein and made a part of this specification.

BACKGROUND OF THE INVENTION

Field of the Invention

The invention relates to an identity verification mechanism, and particularly relates to an identity verification method and apparatus using input of an eye movement.

Description of Related Art

Currently, eye movement tracking techniques are mainly categorized into invasive and non-invasive eye movement tracking techniques. The invasive eye tracking techniques are mainly to set up a search coil in the eyes or use electrooculogram. The non-invasive eye tracking techniques may be categorized into free-head eye tracking techniques or head-mount eye tracking techniques. With the technological developments, the eye movement tracking techniques substantially apply to various fields such as neuroscience, psychology, industrial engineering, ergonomics, marketing and advertisement and computer science and the like.

Assisting the verbally-impaired or the physically challenged in communication by using the eye movement tracking technique brings more convenience for many of the disabled. For example, with the aid of eye movement electronic products, the eyes may substitute for the mouse for communication, access to the Internet and video recreational activities.

SUMMARY OF THE INVENTION

The invention is directed to an identity verification method and an identity verification apparatus adopting an eye movement status for inputting a password, so as to diversify inputting of the password all the more.

An identity verification method according to an embodiment of the invention includes: analyzing an image sequence of a user to determine whether a biological feature conforms to a preset feature; displaying an input interface after the biological feature conforms to the preset feature; executing an eye tracking detection for a face image sequence in the image sequence to detect a blinking movement of the user; executing a mental verification by using the blinking movement; determining the mental verification as passed when the blinking movement conforms to a preset movement.

In one embodiment of the invention, after the mental verification is determined as passed, the embodiment further includes: executing the eye tracking detection for the face image sequence to detect an eye movement status of the user; performing a free will verification procedure based on the eye movement status to determine whether the user is in a state of free will or not in a state of free will; activating an operating procedure when determining the user as in the state of free will; and generating a warning signal and activating the operating procedure when determining the user as not in the state of free will.

In one embodiment of the invention, in a step of performing a free will verification procedure based on the eye movement status, whether a warning option in an input interface is triggered is determined based on the eye movement status; and when the warning option is triggered, the user is determined as not in the state of free will.

In one embodiment of the invention, in a step of performing the free will verification procedure based on the eye movement status, the user is determined as in the state of free will, and a full authority of the operating procedure is granted when a password string through input of an eye movement conforms to a first string; the user is determined as not in the state of free will, and a partial authority of the operating procedure is granted when the password string conforms to a second string.

In one embodiment of the invention, the input interface includes a password input block and a non-password input block. The password input block is configured for a password string to be input. In a step of performing the free will verification procedure based on the eye movement status, whether the non-password input block is chosen is determined based on the eye movement status; the user is determined as not in the state of free will when the number of times the non-password input block is chosen conforms to a preset number.

In one embodiment of the invention, the biological feature is a fingerprint feature, a palm print feature, a face feature, an iris feature or a feature of a blood vessel pattern in the eye whites.

An identity verification method according to an embodiment of the invention includes: providing a user with a displayed input interface for identity verification; analyzing an image sequence of the user; executing an eye tracking detection for a face image sequence in the image sequence to detect a blinking movement of the user; executing a mental verification by using the blinking movement; determining the mental verification as passed when the blinking movement conforms to a preset movement. The eye tracking detection is executed for the face image sequence to detect an eye movement status of the user; a free will verification procedure is performed based on the eye movement status to determine whether the user is in the state of free will or not in the state of free will; an operating procedure is activated when the user is determined as in the state of free will; a warning signal is generated and the operating procedure is activated when the user is determined as not in the state of free will.

An identity verification apparatus according to an embodiment of the invention includes: a display unit, an image capturing unit and a control unit. The control unit is coupled to the display unit and the image capturing unit. The display unit displays an input interface. The image capturing unit captures an image sequence of a user. The control unit analyzes a face image sequence of the image sequence of the user to determine whether a biological feature conforms to a preset feature and displays the input interface after the biological feature conforms to the preset feature. The control unit executes an eye tracking detection for the face image sequence to detect a blinking movement of the user and executes a mental verification by using the blinking movement. When the blinking movement conforms to the preset movement, the control unit determines the mental verification as passed.

In view of the foregoing, combining the biological feature and the eye tracking detection for identity verification not only tightens security but also increases the diversification of operation.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
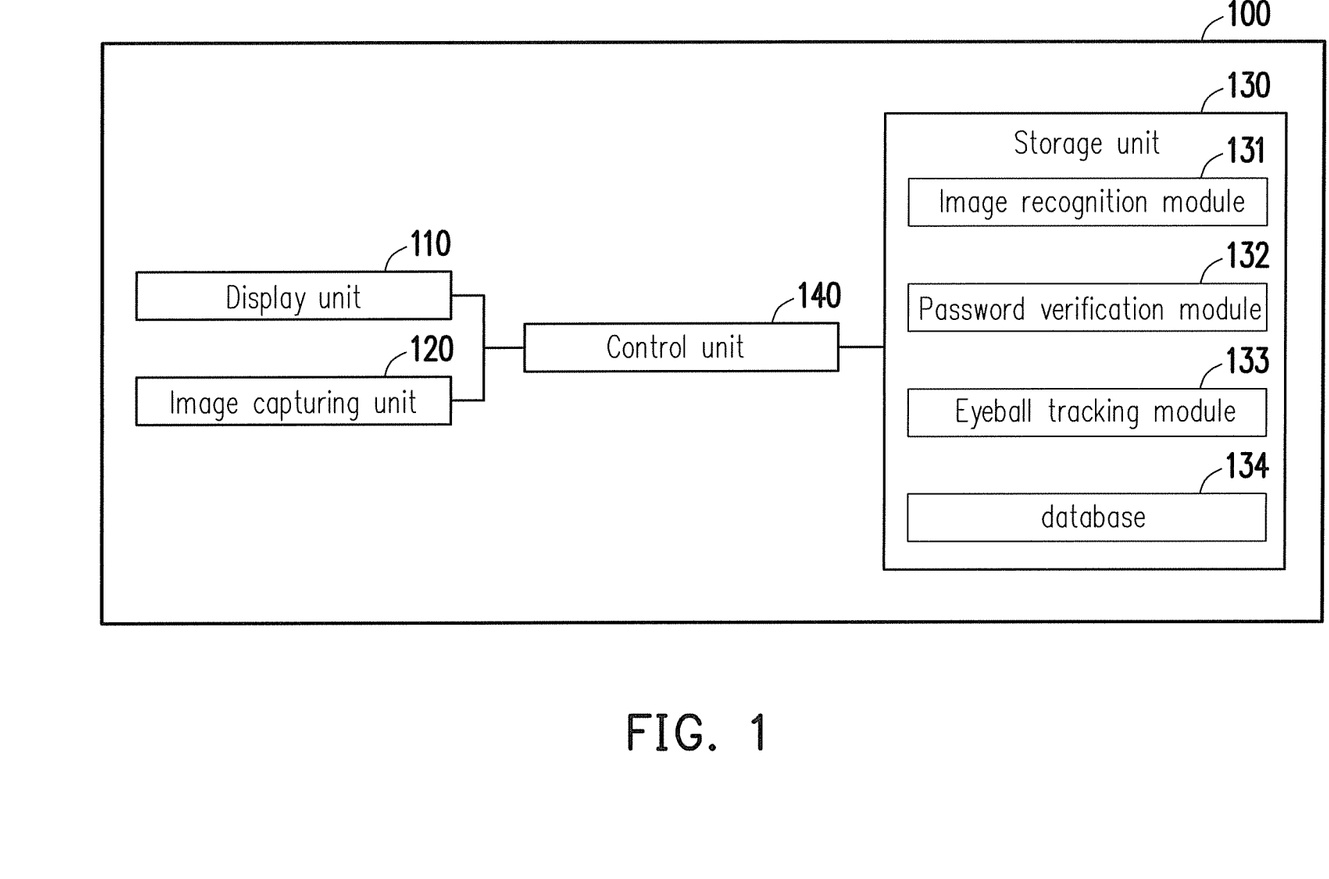
FIG. 1 is a block diagram illustrating an identity verification apparatus according to an embodiment of the invention.

FIG. 1 is a block diagram illustrating an identity verification apparatus according to an embodiment of the invention. Referring to FIG. 1, an identity verification apparatus 100 includes a display unit 110, an image capturing unit 120, a storage unit 130 and a control unit 140. The control unit 140 is coupled to the display unit 110, the image capturing unit 120 and the storage unit 130.

The display unit 110 is configured to display a graphic interface, such as an input interface, for a user to look at a frame of the display unit 110 for operation. The display unit 110 may be a display of any kind such as a liquid crystal display (LCD), a light emitting diode (LED) display, or a flexible display.

The image capturing unit 120 is configured to capture a face image sequence of the user. The image capturing unit 120 is, for example, a video camera, a camera or the like with a charge coupled device (CCD) lens or a complementary metal oxide semiconductor (CMOS) transistor lens.

The storage unit 130 may be, for example, any type of stationary or movable random access memory (RAM), read-only memory (ROM), flash memory, hard disk drive, other similar apparatuses, or a combination thereof.

The control unit 140 is, for example, a central processing unit (CPU), a graphic processing unit (GPU), a physics processing unit (PPU), a programmable microprocessor, an embedded control chip, a digital signal processor (DSP), application specific integrated circuits (ASIC) or other similar apparatuses.

The storage unit 130 includes an image recognition module 131, a password verification module 132 and an eyeball tracking module 133 configured by one or multiple code segments respectively. The control unit 140 executes the modules to perform multiple functions respectively. The storage unit 130 may further include a database 134 to store the account data of a qualified user. In other embodiments, the image recognition module 131, the password verification module 132 and the eyeball tracking module 133 may also respectively be chip sets formed by multiple digital logic gates. The control unit 140 drives and executes the image recognition module 131, the password verification module 132 and the eyeball tracking module 133 to conduct related operating procedures.

The eyeball tracking module 133 executes an eye tracking detection for the face image sequence in an image sequence of the user to detect a blinking movement or eye movement of the user. When the blinking movement conforms to a preset movement, the eyeball tracking module 133 determines a metal ability verification as passed.

Besides, the eyeball tracking module 133 detects multiple gazing locations of the user on the input interface and detects the eye movement status to allow a password string to be input through the input interface. The eye movement status includes at least one of a gazing time duration, an amount of pupil displacement and a pupil movement direction. The eyeball tracking module 133 determines the eye movement status when the eye of the user gazes upon one of multiple input units (numbers or symbols, for example) included in the input interface and determines one of the numbers or symbols that are desired for output based on the blinking movement. For example, a chosen candidate string is determined by the pupil displacement and the pupil movement direction, as well as the gazing location, and a preset blinking movement serves as an input confirmation command. The blinking movement includes the number of times of blinking, the blinking frequency and the blinking duration and the like.

The password verification module 132 executes a password verification procedure. The password verification module 132 verifies whether the password string that is input conforms to a preset password of a qualified user. The image recognition module 131 is configured to analyze the image sequence of the user to determine whether the user is a qualified user that is permitted by the identity verification apparatus 100. For example, the image recognition module 131 determines whether a biological feature of the user conforms to a preset feature. The above biological feature may be, for example, a fingerprint feature, a palm print feature, a face feature, an iris feature or a feature of a blood vessel pattern in the eye whites.

Figure 2:
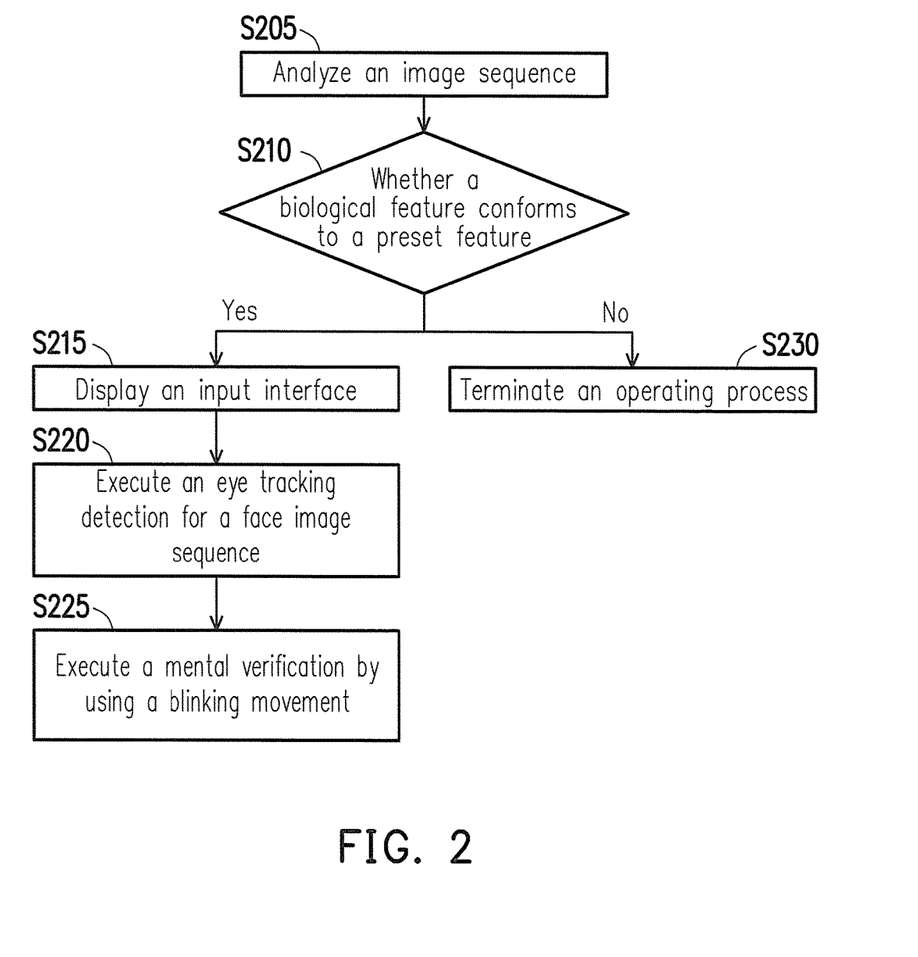
FIG. 2 is a flowchart illustrating an identity verification method according to an embodiment of the invention.

Each of the steps of an identity verification method is described in detail below based on the identity verification apparatus 100 below. FIG. 2 is a flowchart illustrating the identity verification method according to an embodiment of the invention. Referring to FIGS. 1 and 2, in Step S205, the image recognition module 131 analyzes the image sequence to determine whether the biological feature of the user conforms to the preset feature. That is, the image recognition module 131 firstly determines whether the user is a qualified user. If the user is determined as a qualified user, as indicated in Step S215, the input interface is displayed. If the user is determined as an unqualified user, as indicated in Step S230, the operating procedure is terminated.

After the biological feature is determined to conform to the preset feature, in Step S215, the control unit 140 displays the input interface in the display unit 110.

Here, the biological feature is one of the face feature, the iris feature and the feature of the blood vessel pattern in the eye whites or a combination thereof. For example, the image recognition module 131 determines whether the user is a qualified user based on the preset feature in the database 134. That is, the image recognition module 131 determines whether one of the face feature, the iris feature and the feature of the blood vessel pattern in the eye whites or a combination thereof conforms to the preset feature. If the user is determined as an unqualified user, the image recognition module 131 terminates a process of identity verification (Step S230). If the biological feature conforms to the preset feature, the user is preliminarily determined as a qualified user. Accordingly, the input interface is displayed, and the eyeball tracking module 133 is driven. The image recognition module 131 may optionally retrieve a preset password that the user corresponds to from the database 134 and transmits the corresponding password to the password verification module 132 for subsequent comparison.

Next, in Step S220, the eye tracking detection is executed for the face image sequence in the image sequence of the user to detect the blinking movement of the user. That is, the control unit 140 drives the eyeball tracking module 133 to execute the eye tracking detection. Afterwards, in Step S225, the mental verification is executed by the eyeball tracking module 133 by using the blinking movement. When the blinking movement conforms to the preset movement, the mental verification is determined as passed. The above blinking movement includes the number of times of blinking, the blinking frequency and the blinking duration.

For example, if the number of times of blinking is viewed as the blinking movement, the mental verification is determined as passed when the eyeball tracking module 133 detects three blinks. The preset number of times of blinking (i.e., three times) is only enumerated for an illustrative purpose, and the invention is not limited thereto. Further, the preset number of times of blinking may be N, and the value of N may be a positive integer that is chosen arbitrarily by a designer.

For example, if the blinking frequency is viewed as the blinking movement, and a preset range of the blinking frequency is set at 1.9 seconds per blink to 2.1 seconds per blink, when the blinking frequency detected by the eyeball tracking module 133 falls within the preset range of the blinking frequency, the mental verification is determined as passed. The preset range of the blinking frequency (1.9 seconds per blink to 2.1 seconds per blink) is only enumerated for an illustrative purpose, but the invention is not limited thereto. Further, an upper/lower limit of the preset range of the blinking frequency that is set up may be chosen arbitrarily by the designer, and the preset blinking frequency may also be a specific frequency (e.g., two seconds per blink).

For example, if the blinking duration is viewed as the blinking movement, the mental verification is determined as passed when the eyeball tracking module 133 detects that a duration of consistently opening eyes falls within a preset range of the duration of opening eyes. The preset range of the duration of opening eyes is, for example, set at three to five seconds. That is, the mental verification is determined as passed when the eyeball tracking module 133 detects that the user consistently opens eyes for three to five seconds. Accordingly, the preset range of the duration of opening eyes (three to five seconds) is only enumerated for an illustrative purpose, but the invention is not limited thereto. Further, an upper/lower limit of the range of the duration of opening eyes that is set up may be chosen arbitrarily by the designer. Alternatively, only the lower limit of the range of the duration of opening eyes is set up, but the upper limit of the range of the duration of opening eyes is not set up.

The identity verification apparatus 100 may be further configured to require the user to input the password string to execute the identity verification procedure after the mental verification is determined as passed. For example, a password string is input into the input interface through input of an eye movement. The password verification module 132 determines whether the password string that is input is correct. If the password string that is input is correct, an operating procedure is activated. Here, the operating procedure is, for example, an unblocking procedure, a financial transaction procedure and the like. If the password string that is input is incorrect, this operating procedure is over. However, the identity verification procedure based on the password string is optional, and execution of the procedure is not required.

In addition, in order to prevent the user from executing the identity verification procedure in case of intimidation, the identity verification apparatus 100 may further execute a free will verification procedure to determine whether the user is in the state of free will or not in the state of free will. For example, the control unit 140 determines whether the eye movement status conforms to a preset condition to determine whether the user is in the state of free will or not in the state of free will. Yet another example is taken below for descriptions.

Figure 3:
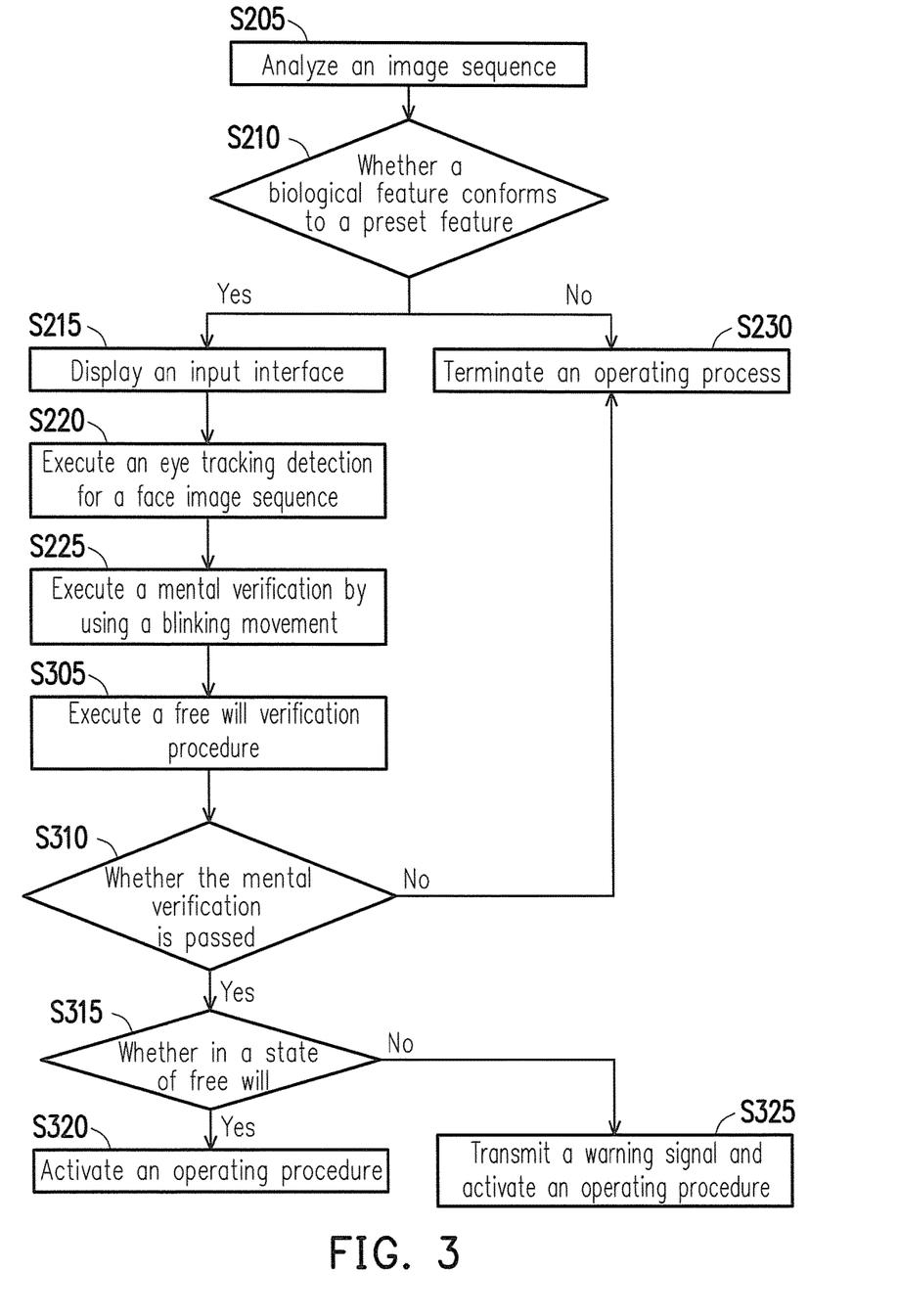
FIG. 3 is a flowchart illustrating an identity verification method according to another embodiment of the invention.

FIG. 3 is a flowchart illustrating an identity verification method according to another embodiment of the invention. In the embodiment, the same steps as steps in FIG. 2 are marked with the same reference numerals, and the descriptions of the same steps are omitted.

After Step S225, in Step S305, the control unit 140 executes the free will verification procedure based on the eye movement status to determine whether the user is in the state of free will or not in the state of free will. For example, the control unit 140 determines whether the eye movement status conforms to the preset condition to determine whether the user is in the state of free will or not in the state of free will.

Afterwards, in Step S310, the eyeball tracking module 133 determines whether the mental verification is passed. If the mental verification is not passed, as indicated in Step S230, this operating procedure is terminated. If the mental verification is passed, in Step S315, whether the user is in the state of free will is determined.

When the user is determined as in the state of free will, as indicated in Step S320, the control unit 140 activates the operating procedure. In Step S320, the control unit 140 does not generate a warning signal. When the user is determined as not in the state of free will, as indicated in Step S325, the control unit 140 generates the warning signal and activates the operating procedure.

Examples are taken below to describe how to execute the free will verification procedure based on the eye movement status.

A warning option is set up in the input interface. When the user is intimidated, for example, and does not operate the apparatus in the state of free will, the warning option may be triggered by the input of the eye movement. The control unit 140 may determine whether the warning option in the input interface is triggered based on the eye movement status. When the warning option is triggered, the control unit 140 determines that the user is currently not in the state of free will. Furthermore, the identity verification apparatus 100 generates and transmits the warning signal to a security facility. Moreover, when the user is determined as not in the state of free will, if the mental verification is passed, the control unit 140 still activates the subsequent operating procedure.

In addition, two sets of preset passwords may be set up in advance. One of the sets (the first string) is provided for the user for use in his or her state of free will, while the other is in use for an operation not in the state of free will when the user is intimidated, for example. Moreover, the two sets of preset passwords have different authorities respectively. Specifically speaking, the user uses the input of the eye movement to input the password string for the password verification module 132 to execute the password verification procedure. When the password string conforms to the first string, the control unit 140 determines the user as in the state of free will and grants a full authority of the operating procedure. When the password string conforms to the second string, the situation means that the user is not in the state of free will during the operation. Therefore, the control unit 140 determines the user as not in the state of free will and grants a partial authority of the operating procedure.

Also, further setup may be as follows: when the user clicks within a non-password input block through the input of the eye movement, and the number of clicks surpasses a preset number, the user is determined as not in the state of free will. Specifically speaking, the input interface includes a password input block and a non-password input block. The password input block is configured for the password string to be input. The control unit 140 determines whether the non-password input block is chosen based on the eye movement status, and when the number of times the non-password input block is chosen conforms to the preset number, the user is determined as not in the state of free will.

In addition, the free will verification procedure may also be set up to be executed by using the blinking movement. For example, when the number of times of blinking is detected as five or above (the number of times of blinking depends on circumstances), the user is determined as not in the state of free will. Also, for example, when the blinking frequency is detected to fall within a range of warning frequency, the user is determined as not in the state of free will. Alternatively, if the duration when the user constantly opens eyes surpasses a warning duration (six seconds or more, for example), the user is determined as not in the state of free will.

In addition, the identity verification method may also be executed through a remote server apparatus, while a local apparatus is only responsible for capturing the face image sequence and displaying the input interface and producing a result. Yet another example is taken below for descriptions.

Figure 4:
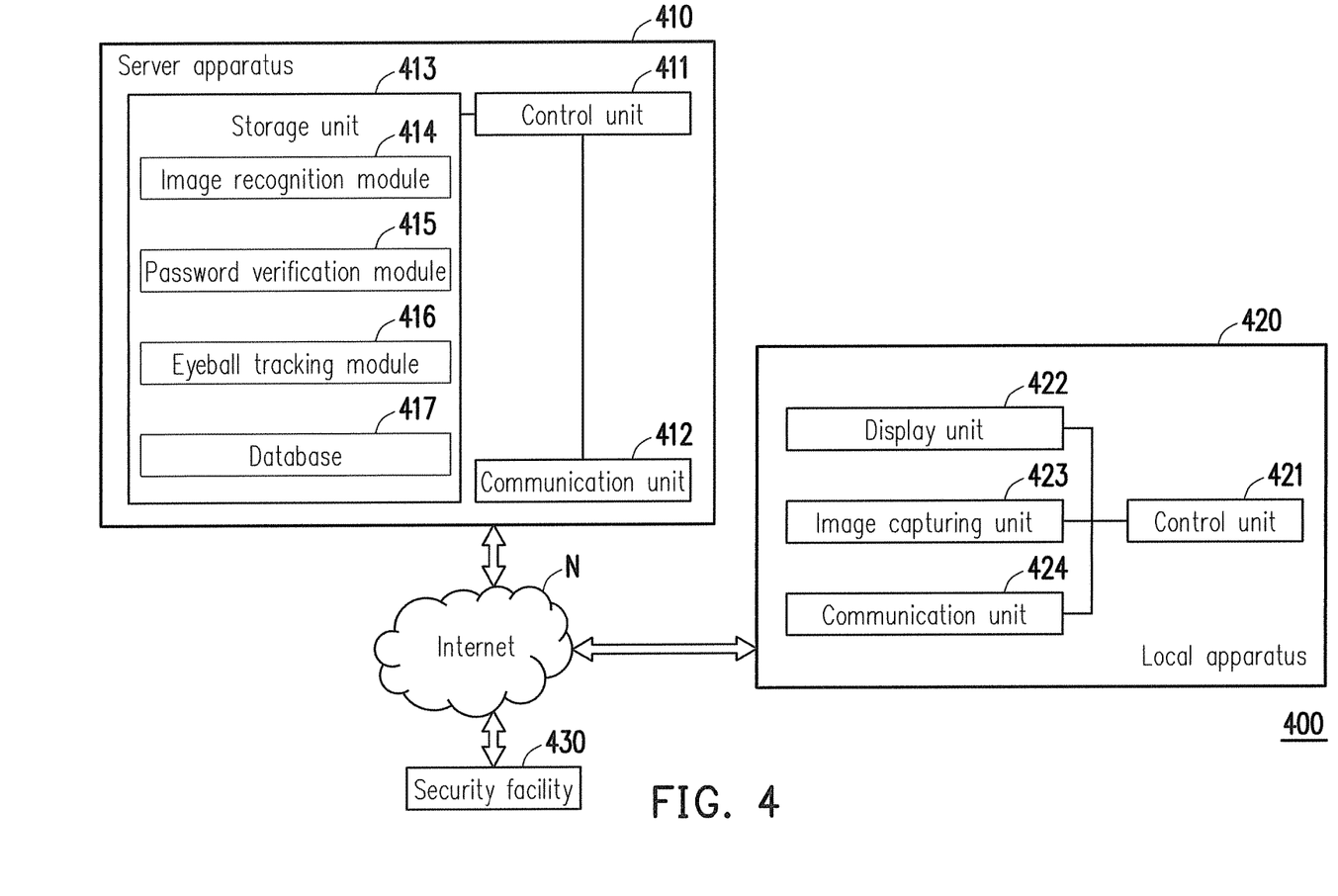
FIG. 4 is a block diagram illustrating an identity verification apparatus according to another embodiment of the invention.

FIG. 4 is a block diagram of an identity verification apparatus of another embodiment of the invention. Referring to FIG. 4, the identity verification apparatus 400 includes a server apparatus 410, a local apparatus 420 and a security facility 430. The server apparatus 410, the local apparatus 420 and the security facility 430 are electronic apparatuses capable of computation and engage in communication through an Internet N. The security facility 430 may be, for example, a server of the police station or a server of a financial organization.

The server apparatus 410 includes a control unit 411, a communication unit 412 and a storage unit 413. The control unit 411 and the storage unit 413 are similar to the control unit 140 and the storage 130 respectively. The storage unit 413 includes an image recognition module 414, a password verification module 415, an eyeball tracking module 416 and a database 417. Reference is made to the image recognition module 131, the password verification module 132, the eyeball tracking module 133 and the database 134 for related descriptions.

The local apparatus 420 includes a control unit 421, a display unit 422, an image capturing unit 423 and a communication unit 424. The communication unit 412 and the communication unit 424 may be wired or wireless network cards, for example.

In the embodiment, the local apparatus 420 is only responsible for capturing the face image sequence. Afterwards, the face image sequence is transmitted to the server apparatus 410 by the communication unit 424, and the identity verification procedure is executed by the server apparatus 410.

Specifically speaking, the control unit 421 of the local apparatus 420 drives the image capturing unit 423 in advance to obtain the image sequence of the user and transmits the image sequence to the server apparatus 410. Next, the control unit 411 of the server apparatus 410 analyzes the image sequence to determine whether the biological feature conforms to the preset feature and transmits an analytical result to the local apparatus 420. If the analytical result suggests that the biological feature conforms to the preset feature, the control unit 421 of the local apparatus 420 displays the input interface in the display unit 422. In addition, the setup may be as follows: if the analytical result suggests that the biological feature does not conform to the preset feature, the control unit 421 of the local apparatus 420 may not display the input interface.

After displaying the input interface, the control unit 411 of the server apparatus 410 executes the eyeball tracking algorithm for the face image sequence in the image sequence of the user to detect the blinking movement of the user, and the mental verification is executed by using the blinking movement.

The invention also provides a computer program product configured for the identity verification apparatus. The computer program product includes a computer-readable recording medium, and the computer-readable recording medium records at least one procedural command. The above procedural command is generally formed by multiple code segments (a code segment for establishing an organizational structure, a checking window code segment, a setup code segment and a deployment code segment). The above procedural command is uploaded onto an electronic apparatus to complete the identity verification method and the function of the identity verification apparatus.

In view of the foregoing, the user combines the biological feature with the eye tracking detection during the identity verification process to heighten the possibilities of identity verification substantially. In addition, using eyeball movements to execute the input of the eye movement diversifies operation. Moreover, under the circumstance that the user is subject to intimidation, the user may use the eye movement to trigger a warning signal to ask for help without being noticed.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:
1. An identity verification method, comprising:
analyzing an image sequence of a user to determine whether a biological feature conforms to a preset feature;
displaying an input interface in response to that the biological feature conforms to the preset feature;
detecting a blinking movement of the user by executing an eye tracking detection for a face image sequence in the image sequence;

determining whether the blinking movement of the user conforms a preset movement by executing a mental verification; and determining the mental verification as passed if the blinking movement conforms to the preset movement, executing the eye tracking detection for the face image sequence to detect an eye movement status of the user;

executing a free will verification procedure based on the eye movement status to determine whether the user is in a state of free will or not in the state of free will;

activating an operating procedure when determining the user as in the state of free will; and generating a warning signal and activating the operating procedure when determining the user as not in the state of free will, wherein the step of executing the free will verification procedure based on the eye movement status comprises:

determining the user as in the state of free will and granting a full authority of the operating procedure when a password string through input of an eye movement confirms to a first string; and determining the user as not in the state of free will and granting a partial authority of the operating procedure when the password string confirms to a second string.

2. The identity verification method according to claim 1, wherein the step of executing the free will verification procedure based on the eye movement status comprises:

determining whether a warning option in the input interface is triggered based on the eye movement status; and determining the user as not in the state of free will when the warning option is triggered.

3. The identity verification method according to claim 1, wherein the biological feature is a fingerprint feature, a palm print feature, a face feature, an iris feature or a feature of a blood vessel pattern in the eye whites.

4. An identity verification method, comprising:

providing a user with a display input interface for identity verification, wherein the display input interface includes a password input block and a non-password input block, the password input block being configured for a password string to be input;

analyzing an image sequence of the user;

detecting a blinking movement of the user by executing an eye tracking detection for a face image sequence in the image sequence;

executing a mental verification by determining whether the blinking movement of the user conforms a preset movement;

determining the mental verification as passed if the blinking movement conforms to a preset movement;

detecting an eye movement status of the user by executing the eye tracking detection for the face image sequence in response to that the mental verification is passed;

determining whether the user is in a state of free will or not in the state of free will by executing a free will verification procedure based on the eye movement status, wherein the step of executing the free will verification procedure based on the eye movement status comprises:

determining whether the non-password input block is chosen based on the eye movement status; and determining the user as not in the state of free will when determining that the number of times the non-password input block is chosen confirms to a preset number;

activating an operating procedure in response to that determining the user as in the state of free will; and generating a warning signal and activating the operating procedure in response to that determining the user as not in the state of free will.

5. An identity verification apparatus, comprising:

a display unit, displaying an input interface;

an image capturing unit, capturing an image sequence of a user; and a control unit, coupled to the display unit and the image capturing unit, wherein the control unit analyzes a face image sequence in the image sequence of the user to determine whether a biological feature conforms to a preset feature and displays the input interface in response to that the biological feature conforms to the preset feature; the control unit detects a blinking movement of the user by executing an eye tracking detection for the face image sequence, and executes a mental verification by determining whether the blinking movement of the user conforms a preset movement; and the control unit determines the mental verification as passed if the blinking movement conforms to the preset movement, and when the control unit determines the mental verification as passed, the control unit further executes the eye tracking detection for the face image sequence to detect an eye movement status of the user, and a free will verification procedure is executed based on the eye movement status to determine whether the user is in a state of free will or not in a state of free will; the control unit activates an operating procedure when determining the user as in the state of free will; and the control unit generates a warning signal and activates the operating procedure when determining the user as not in the state of free will, wherein the control unit determines the user as in the state of free will and grants a full authority of the operating procedure when a password string through input of an eye movement conforms to a first string; and the control unit determines the user as not in the state of free will and grants a partial authority of the operating procedure when the password string confirms to a second string.

6. The identity verification apparatus according to claim 5, wherein the control unit determines whether a warning option in the input interface is triggered based on the eye movement status and determines the user as not in the state of free will when the warning option is triggered.

7. The identity verification apparatus according to claim 5, wherein the input interface comprises a password input block and a non-password input block, the password input block is configured for a password string to be input, the control unit determines whether the non-password input block is chosen based on the eye movement status and determines the user as not in the state of free will when determining that the number of times the non-password input block is chosen conforms to a preset number.

8. The identity verification apparatus according to claim 5, wherein the biological feature is a fingerprint feature, a palm print feature, a face feature, an iris feature or a feature of a blood vessel pattern in the eye whites.

9. The identity verification apparatus according to claim 5, comprising:

a local apparatus, comprising the display unit and the image capturing unit; and a server apparatus, connected to the local apparatus through the Internet to receive the face image sequence from the local apparatus, and comprising the control unit, wherein the local apparatus displays the input interface to the display unit after the control unit determines that the biological feature conforms to the preset feature.

\* \* \* \* \*